United States Patent [19]

Harmuth

[11] 4,113,681
[45] Sep. 12, 1978

[54] THERMOPLASTIC POLYVINYL CHLORIDE-ACRYLIC POWDER COATING COMPOSITION

[75] Inventor: Charles Moore Harmuth, Wilmington, Del.

[73] Assignee: E. I. Du Pont de Nemours and Company, Wilmington, Del.

[21] Appl. No.: 795,565

[22] Filed: May 10, 1977

[51] Int. Cl.$^2$ .................. C08L 91/00; C08L 63/00
[52] U.S. Cl. .................. 260/28.5 D; 260/31.8 M; 260/837 PV; 260/899; 428/327; 428/332; 428/375; 428/402; 526/317
[58] Field of Search .................. 260/28.5 D, 837 PV, 260/899, 31.8 M; 428/327, 402, 407; 526/317

[56] References Cited

U.S. PATENT DOCUMENTS

| | | | |
|---|---|---|---|
| 3,066,043 | 11/1962 | Hechtman et al. | 260/899 |
| 3,453,225 | 7/1969 | Pollock | 260/28.5 D |
| 3,678,133 | 7/1972 | Ryan | 260/31.8 M |
| 3,784,501 | 1/1974 | Pettit | 260/31.8 M |
| 3,842,027 | 10/1974 | Richardson | 260/31.8 R |
| 3,845,002 | 10/1974 | Hiss | 260/31.8 M |
| 3,859,389 | 1/1975 | Carty et al. | 260/31.8 M |
| 3,882,198 | 5/1975 | Miller | 260/899 |
| 3,919,137 | 11/1975 | Dyer et al. | 260/17 A |
| 3,941,857 | 3/1976 | Wu | 260/837 PV |
| 3,983,186 | 9/1976 | Eilers et al. | 260/28.5 D |
| 3,988,493 | 10/1976 | Yallourakis | 260/837 PV |
| 3,991,135 | 11/1976 | Kraft | 260/876 R |
| 4,002,702 | 1/1977 | Kuhn | 260/28.5 D |
| 4,009,224 | 2/1977 | Warnken | 260/837 R |

FOREIGN PATENT DOCUMENTS 787,556 12/1972 Belgium.
2,419,329 11/1974 Fed. Rep. of Germany.
2,457,308 6/1975 Fed. Rep. of Germany.

OTHER PUBLICATIONS

Nakajima "Adv. in Chem. Series" #125, Erzin Ed. ACS, Wash., D.C., 1973, pp. 98–107.
Billmeyer J.P.S. PTC, No. 8, pp. 161–178 (1965). "Characterization of Mol Wt. Dist. in Hi Polymers."

Primary Examiner—Herbert J. Lilling

[57] ABSTRACT

A thermoplastic powder coating composition of powder particles having a size in the range of about 1–100 microns in which the powder particles are a blend of
(A) a polyvinyl chloride terpolymer of vinyl chloride/vinyl acetate/maleic acid and
(B) an acrylic polymer and
(C) an ester plasticizer;
the powder can contain in addition to the above polymers a heat stabilizer such as an organometallic mercaptide, an epoxy resin, pigments, ultraviolet light-absorbing agents and polyethylene wax; the powder coating composition is useful as a finish for metals such as tubing, wires, fence posts, lawn furniture, play equipment and the like.

10 Claims, No Drawings

THERMOPLASTIC POLYVINYL CHLORIDE-ACRYLIC POWDER COATING COMPOSITION

BACKGROUND OF THE INVENTION

This invention is related to powder coating compositions and in particular to a polyvinyl chloride containing powder coating composition.

Powder coating compositions are well known in the art and have been used in the place of conventional solvent and water-based paints to coat a variety of different substrates. Polyvinyl chloride powder coatings are broadly used and well known as shown by Richardson U.S. Pat. No. 3,842,027 issued Oct. 15, 1974. These polyvinyl chloride powder coatings are applied by conventional fluid bed or electrostatic spray techniques. However, these polyvinyl chloride powders agglomerate and lose free flow characteristics when exposed to heat and pressure in storage or in application equipment. When this occurs, additional sieving or mixing of the powder is required to achieve uniform application of the powder on substrates.

Another deficiency of the polyvinyl chloride powders is that relatively thin finishes of the powders about 1–2 mils in thickness contain pinholes and make the powder unacceptable as an exterior finish for metals.

SUMMARY OF THE INVENTION

The thermoplastic powder coating composition is of powder particles having a particle size range of about 1–100 microns; wherein the powder particles are of a binder which is a blend of the following:

(A) about 45–85% by weight of a polyvinyl chloride terpolymer of
  (1) 72–87% by weight, based on the weight of the terpolymer, of vinyl chloride,
  (2) 10–25% by weight based on the weight of the terpolymer, of vinyl acetate and
  (3) 0.1–3% by weight, based on the weight of the terpolymer of maleic acid; wherein the terpolymer has a weight average molecular weight of about 20,000–125,000;

(B) about 5–40% by weight of an acrylic polymer of an alkyl methacrylate, an alkyl acrylate, each having 1–12 carbon atoms in the alkyl group, or mixtures thereof and an α-B unsaturated ethylenically unsaturated carboxylic acid; and (C) about 10–25% by weight of an ester plasticizer.

DESCRIPTION OF THE INVENTION

The thermoplastic powder coating composition has excellent flowability even after exposure to moderate heat and pressure conditions that exist in storage and in the operation of conventional application equipment. Also, thin finishes of the powder are continuous and free of pinholes and are excellent exterior finishes for metals.

The powder composition is of powder particles that have a particle size range of about 1–100 microns. Smaller particles can be present since no effort is made to remove particles under 1 micron after the powder is passed through a sieve to remove large particles.

About 45–85% by weight of the powder coating composition is of a polyvinyl chloride terpolymer or a mixture of these terpolymers. The terpolymer is of about 72–87% by weight of vinyl chloride, 10–25% by weight of vinyl acetate and 0.1–3% by weight of maleic acid. One preferred terpolymer that forms a high quality powder is of about 77–82% by weight vinyl chloride, 17–22% by weight of vinyl acetate and 1–2% by weight of maleic acid. One particularly preferred terpolymer has a weight ratio of vinyl chloride/vinyl acetate/maleic acid of 80/20/1.

The polyvinyl chloride terpolymer has a weight average molecular weight of about 20,000–125,000 and preferably about 40,000–80,000.

The weight average molecular weight of the polymers used in the powder coating composition is determined by gel permeation chromatography using polystyrene as a standard.

About 5–40% by weight of an acrylic polymer is used in the coating composition. The acrylic polymer is of an alkyl methacrylate or an alkyl acrylate or mixtures thereof and an α-B ethylenically unsaturated carboxylic acid.

Typical alkyl methacrylates and alkyl acrylates that can be used in the acrylic polymer have 1–12 carbon atoms in the alkyl group and are, for example, methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate, ethyl acrylate, propyl acrylate, butyl acrylate, isobutyl acrylate, pentyl acrylate, hexyl acrylate, 2-ethylhexyl acrylate, nonyl acrylate, lauryl acrylate and the like.

Acrylic acid, methacrylic acid and itaconic acid are typically useful α-B ethylenically unsaturated carboxylic acids.

Typical acrylic polymers comprise about 40–95% by weight of methyl methacrylate, 4.7–55% by weight of an alkyl acrylate or an alkyl methacrylate having 2–12 carbon atoms in the alkyl group and 0.3–5% by weight of an α-β ethylenically unsaturated carboxylic acid. These polymers have a weight average molecular weight of about 10,000–100,000.

These acrylic polymers have a melt index measured according to ASTM D-1238 of about 0.1 grams flow per 10 minutes measured at about 150° C up to about 8 grams flow per 10 minutes measured at about 200° C.

One useful acrylic polymer is of methyl methacrylate (MMA)/butyl methacrylate (BMA)/methacrylic acid (MAA). The polymer has a weight average molecular weight of about 20,000–40,000. One particularly useful polymer is of about 60–95% MMA/4.7–35% BMA/0-.3–5% MAA. One preferred acrylic polymer is of 69% MMA/30% BMA/1% MAA.

The powder coating composition is usually pigmented and contains pigment in a pigment to binder ratio of about 0.1:100 to about 75:100. The binder is the film-forming constituents in the composition.

Any of the conventional pigments can be used, for example, metallic oxides such as titanium dioxide, zinc oxide and the like, sulfates, carbonates, carbon black, organic pigments such as phthalocyanine blue and green pigments; titanates such as chrome antimony titanate, silica, talc, china clay, metallic flakes such as aluminum flake, metallic powders, metallic hydroxides, "Afflair" pigments such as mica coated with titanium dioxide and a variety of other inorganic, organic pigments, dyes and lakes. One particularly useful combination of pigments is a mixture of titanium dioxide, carbon black, copper phthalocyanine green, barium sulfate and a fusion pigment of titanium//antimony/chrome.

The powder coating can contain about 1–5% by weight of a heat stabilizer such as an organometallic mercaptide. Usually a butyl tin mercaptide is used. One particularly useful mercaptide is a mixture of monobutyl tin mercaptide and dibutyl tin mercaptide. This mixture provides thermostability to the powder coating composition. The preferred mixture has an approximate tin content of 21-25% and an approximate sulfur content of 9-12%. A more preferred mixture has an approximate tin content of 23.5%; approximate sulfur content of 10.5%; and viscosity, measured by ASTM-1545-63, of about B.

The coating can contain about 1-10% by weight of a low molecular weight epoxyhydroxy polyether resin to improve heat stability of the powder. One useful resin is of the formula

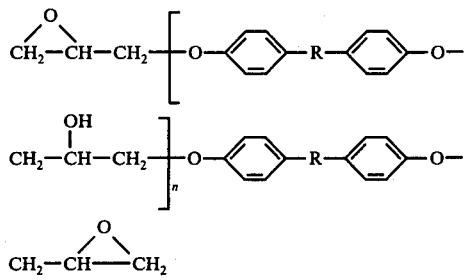

where R is an alkylene group of 1-6 carbon atoms and n is an integer sufficiently large to provide a molecular weight of about 300 to 600. In one particularly useful resin R is

or $CH_2$. A preferred epoxy resin of the above type is the reaction product of bisphenol A and epichlorohydrin having an epoxide equivalent of about 180-200 where R is

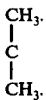

Epoxide equivalent is the grams of resin containing one gram equivalent of epoxide.

An ultraviolet light-absorbing agent can be incorporated into the coating composition in an amount of about 0.1-2% by weight. Substituted benzotriazoles, benzophenones, benzoates and acrylonitriles are typically useful ultraviolet light-absorbing agents.

Typically useful substituted benzophenones have the structural formula

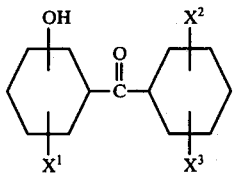

where $X^1$, $X^2$ and $X^3$ are individually selected from the group of hydrogen, hydroxyl, alkyl, alkoxy and halogen. One useful benzophenone is 4-dodecyloxy-2-hydroxy benzophenone. A particularly useful benzophenone is 2-hydroxy-4-n-octoxy benzophenone.

Typical substituted benzotriazoles have the formula

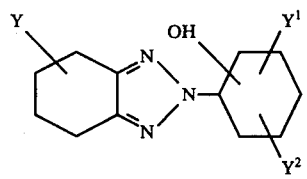

where Y, $Y^1$ and $Y^2$ are individually selected from the group of hydrogen, hydroxyl, alkyl and halogen.

One useful benzotriazole is 2-(2'-hydroxy-5'-methyl phenyl) benzotriazole. Others are disclosed in U.S. Pat. Nos. 3,640,928, 3,004,896 and 3,189,615.

Typically useful substituted acrylonitriles are ethyl-2-cyano-3,3-diphenyl acrylate and 2-ethylhexyl-2-cyano 3,3 diphenyl acrylate.

A typically useful substituted benzoate is 2,4-di-t-butyl phenyl 3,5-di-t-butyl-4-hydroxy benzoate.

Low molecular polyethylene wax in an amount of about 0.1-1% by weight can also be used in the coating composition.

To improve grinding of the powder, which is a step used in preparation of the powder, about 0.5-20% by weight of a hard polymer such as polymethyl methacrylate and copolymers thereof, cellulose acetate butyrate and the like are used.

Plasticizers in particular ester plasticizers can be added to the composition in amounts of about 1-12%, by weight. Typically useful plasticizers are disclosed in Col. 2, lines 41-60, of the above-mentioned U.S. Pat. No. 3,842,027. This portion of the patent is incorporated by reference. One preferred plasticizer which forms a high quality powder is triisodecyl trimellitate.

One preferred powder coating composition that utilizes the above constituents and that provides a flowable, nonsticking powder and forms that has an excellent melt flow on baking and forms continuous pinhole-free finishes on metals is a blend of the following constituents:

(A) 55 - 75% by weight of a polyvinyl chloride terpolymer of 77-82% by weight of vinyl chloride, 17-22% by weight of vinyl acetate, 1-2% by weight of maleic acid, (B) 10-25% by weight of an acrylic polymer of 60-95% by weight of methyl methacrylate, 4.7-35% by weight of butyl methacrylate and 0.3-5% by weight of methacrylic acid, (C) 10-20% by weight of an ester plasticizer such as triisodecyl trimellitate.

(D) 1-5% by weight of an organometallic mercaptide such as a mixture of mono and dibutyl tin mercaptide, (E) 1-10% by weight of a low molecular weight epoxyhydroxy polyether resin, (F) 0.1-2% by weight of an ultraviolet light-absorbing agent of a substituted benzophonone, a substituted benzotriazole, a substituted benzoate or a substituted acrylonitrile, (G) 0.1-1% by weight of a low molecular weight polyethylene wax, One method for preparing the powder coating composition of this invention is to blend the above constituents and then pass the blend through a conventional extruder. Another method is to charge the above constituents onto a two-roll mill having one roll heated to about 80°–100° C and the other roll at the ambient temperature and melt blend the constituents together. The composition resulting from either of the above methods is formed into a powder by grinding in conventional grinding equipment under low temperatures; e.g., a pin disc mill, a fluid energy mill, or a hammer mill. Either dry ice or liquid nitrogen can be used to attain a low grinding temperature. After grinding, the powder is passed through a sieve to remove large particles. Usually a 140 mesh sieve is used.

Pellets of the above described binder can be formed using conventional extrusion techniques and can be sold to a processor. The processor would grind the pellets into a powder. Typical pellets have a size of at least 1500 microns in the largest dimension and can be up to 15,000 microns in the largest dimension.

APPLICATION OF THE POWDER COATING COMPOSITION

The powder coating composition of this invention can be applied to hot or cold metal substrates by utilizing fluidized bed or electrostatic spray techniques. Preferably, electrostatic spraying is utilized in which a voltage of 20–100 kilovolts is applied to a spray gun. The powder coating composition is applied in several passes to provide a thickness after fusion of 1–10 mils, preferably 2–4 mils. The coating is baked, for example, at 175°–210° C for 3 to 5 minutes, to fuse the powder particles into a continuous, uniform, smooth and glossy coating.

The powder coating composition of this invention can be applied to untreated metal substrates. Also, the composition can be used directly over galvanized steel, phosphatized steel or aluminum.

The powder coating composition is useful for providing finishes on the metal exteriors of products such as tubing, wires, fence posts, lawn furniture and the like.

The following example illustrates the invention. All quantities are on a weight basis unless otherwise indicated.

EXAMPLE 1

The following ingredients are blended together:

| | Parts by Weight |
|---|---|
| Polyvinyl chloride terpolymer (vinyl chloride/vinyl acetate/maleic anhydride polymer in a weight ratio of 80/20/1 and having a weight average molecular weight of 65,000) | 80.0 |
| Acrylic polymer (methyl methacrylate/butyl methacrylate/methacrylic acid weight ratio 69/30/1 having a weight average molecular weight of about 30,000 and a melt index measured at 150° C of 0.1676 grams flow per 10 minutes) | 20.0 |
| Plasticizer (triisodecyl trimellitate) | 25.0 |
| Liquid epoxy resin (epoxyhydroxy polyether resin of epichlorohydrin and bisphenol A having an epoxide equivalent of 182–190 and a viscosity of 11,000–14,000 centipoise at 25° C and a molecular weight of about 364–380) | 4.0 |
| Butyl tin mercaptide mixture (a mixture of monobutyl tin mercaptide and dibutyl tin mercaptide having a tin content of about 23.5% and a sulfur content of about 10.5%) | 2.4 |
| "Bareco" polywax 2000 (low molecular weight polyethylene wax) | 0.5 |
| Ultraviolet light-absorbing agent 2,4-di-t-butyl phenyl 3,5-di-t-butyl-4hydroxy benzoate. | 0.4 |
| TOTAL | 132.3 |

A blend of the above ingredients is charged onto a two-roll mill having one roll at about 85°–95° C and the other roll at room temperature and milled for 20 minutes. The resulting composition is ground into a powder in a pin disc mill cooled to about −72° C with dry ice. The powder is passed through a 140 mesh sieve to remove large particles.

The powder then is sprayed onto phosphatized 24 gauge cold roll steel panels using a Model 222 Ransburg electrostatic powder gun. The gun uses 60 volts of electricity to charge the powder and 60 pounds per square inch air pressure. The coated panels are baked for 5 minutes at 205° C. The resulting finish on each of the panels is about 2–3 mils thick, has excellent adhesion to the substrate, is free from popping and cratering and has a good appearance. The finish has excellent impact resistance as shown by an impact test in which the finish is subjected to an impact of 80 and 160 pounds per square inch.

The finish has excellent resistance to corrosion as shown by the salt spray test in which no blisters resulted after 250 hours of exposure to a salt spray and no flaking or peeling of finish from a scribe mark which is through the finish to the metal is noted. The flaking and peeling of the finish is known as "creep". After 1000 hours' exposure to salt spray, 5/16 of an inch of creep from the scribe mark is noted.

EXAMPLE 2

Three powder coating compositions, A, B and C, are prepared as follows:

| | Parts by Weight | | |
|---|---|---|---|
| | A | B | C |
| Polyvinyl chloride terpolymer (described in Example 1) | 80.0 | 90.0 | 80.0 |
| Acrylic polymer (described in Example 1) | 20.0 | 10.0 | 20.0 |
| Plasticizer (triisodecyl trimellitate) | 25.0 | 22.0 | 25.0 |
| Liquid epoxy resin (described in Example 1) | 4.00 | 4.5 | 4.0 |
| Butyl tin mercaptide mixture (described in Example 1) | 2.40 | 2.70 | 2.4 |
| Ultraviolet light absorbing agent (described in Example 1) | 1.4 | 0.45 | 0.40 |
| "Bareco" wax (described in Example 1) | 0.50 | 0.45 | 0.40 |
| Titanium dioxide pigment | — | — | 10.00 |
| Carbon black pigment | 3.00 | 3.00 | — |
| Barytes pigment | 8.00 | 8.00 | 8.00 |

Powders coating compositions A, B and C are prepared by using the same procedure as set forth in Example 1. Each of the resulting powders A, B and C is fine and flowable. Each of the powders is applied to phosphatized steel panels as in Example 1 and baked as in Example 1. In each case, a finish of about 2–3 mils thick is formed that has excellent adhesion to the substrate and is free from popping and blistering.

Several coated panels are subjected to an impact test of 80 inch pounds and 160 inch pounds at 22° C and at −7° C. The results of the impact tests are as follows:

| | Rating | | | | | |
|---|---|---|---|---|---|---|
| Temperature | 22° C | | | −7° C | | |
| Panel | A | B | C | A | B | C |
| 80 inch pounds | 10 | 10 | 10 | 9 | 9 | 9 |
| 160 inch pounds | 8 | 8 | 8 | 7 | 7 | 7 |

A rating of 10 indicates that there are no breaks in the finish. A rating of 0 indicates a complete failure of the finished. As the rating decreases, an increase in deterioration of the finish is indicated.

Several of the above coated panels are subjected to a salt spray test as in Example 1. After 500 hours of exposures, no creep or blistering of the finish on the panels is noted. After 1000 hours some small blisters are noted in the finish but no creep.

Coated panels are subjected to a mandrel bend test in which a panel is bent at a 90° angle over a mandrel at −7° C. No cracking or chipping of any of the finish of A, B or C on the panels is noted, which indicates the finish is flexible.

What is claimed is:

1. A thermoplastic powder coating composition of powder particles having a particle size of about 1–100 microns; wherein the powder particles consist essentially of a binder of a blend of:
   (A) about 45–85% by weight of a polyvinyl chloride terpolymer consisting essentially of
      (1) 72–87% by weight, based on the weight of the terpolymer, of vinyl chloride,
      (2) 10–25% by weight, based on the weight of the terpolymer, of vinyl acetate and
      (3) 0.1–3% by weight, based on the weight of the terpolymer, of maleic acid; wherein the terpolymer has a weight average molecular weight of about 20,000–125,000 determined by gel permeation chromatography using polystyrene as a standard;
   (B) about 5–40% by weight of an acrylic polymer consisting essentially of 40–95% by weight of a methyl methacrylate, 4.7–55% by weight of an alkyl acrylate or an alkyl methacrylate having 2–12 carbon atoms in the alkyl group and 0.3–5% by weight of an α-β ethylenically unsaturated carboxylic acid and having a weight average molecular weight of about 10,000–100,000 determined as above; and
   (C) about 10–25% by weight of a plasticizer of triisodecyl trimellitate 2. The powder coating composition of claim 1 containing pigments in a pigment to binder ratio of 0.1:100 to about 75:100.

3. The powder coating composition of claim 2 containing about 1–5% by weight of a heat stabilizer.

4. The powder coating of claim 3 in which the heat stabilizer is an organometallic mercaptide.

5. The powder coating of claim 2 containing about 1–10% by weight of a low molecular weight epoxy hydroxy polyether resin.

6. The powder coating composition of claim 5 in which the epoxy resin is of the formula

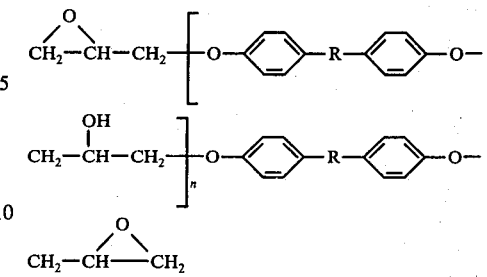

where R is an alkylene group of 1–6 carbon atoms and $n$ is an integer sufficiently large to provide a molecular weight of about 300 to 600.

7. The powder coating composition of claim 2 containing about 0.1–2% by weight of an ultraviolet light-absorbing agent.

8. The powder coating composition of claim 7 in which the ultraviolet light-absorbing agent is a substituted benzophenone, a substituted benzotriazole, a substituted benzoate or a substituted acrylonitrile.

9. The powder coating composition of claim 2 containing about 0.1–1% by weight of a low molecular weight polyethylene wax.

10. A thermoplastic powder coating composition of powder particles having a particle size range of about 1–100 microns wherein the powder particles consists essentially of
   (A) 55–75% by weight of polyvinyl chloride terpolymer consisting essentially of
      (1) 77–82% by weight of vinyl chloride,
      (2) 17–22% by weight of vinyl acetate,
      (3) 1–2% by weight of maleic acid wherein the terpolymer has a weight average molecular weight of about 20,000–125,000 determined by gel permeation chromatography using polystyrene as a standard;
   (B) 10–25% by weight of an acrylic polymer consisting essentially of
      (1) 60–95% by weight of methyl methacrylate,
      (2) 4.7–35% by weight of butyl methacrylate,
      (3) 0.3–5% by weight of methacrylic acid. wherein the acrylic polymer has a weight average molecular weight of about 10,000–100,000 determined as above;
   (C) 10–20% by weight of triisodecyl trimellitate;
   (D) 1–5% by weight of an organometallic mercaptide of a mixture of monobutyl tin mercaptide and dibutyl tin mercaptide;
   (E) 1–10% by weight of a low molecular weight epoxyhydroxy polyether resin;
   (F) 0.1–2% by weight of an ultraviolet light absorbing agent of a substituted benzophenone, a substituted benzotriazole, a substituted benzoate or a substituted acrylonitrile, and
   (G) 0.1–1% by weight of a low molecular weight polyethylene wax.

* * * * *